Aug. 1, 1939.   J. C. LEMMING ET AL   2,168,301
METHOD OF SIZING POROUS METAL BUSHINGS
Filed June 18, 1937   2 Sheets-Sheet 1

INVENTORS
John C. Lemming
James H. Davis
Spencer, Hardman & Feher
their ATTORNEYS

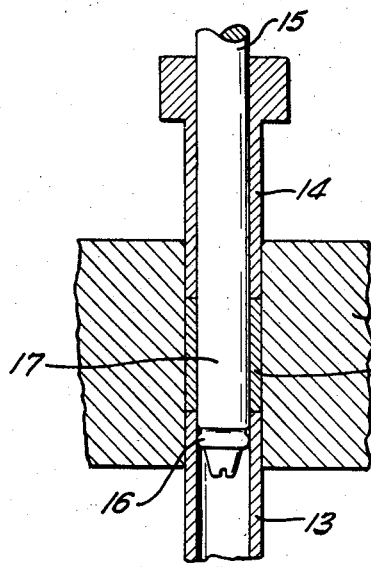
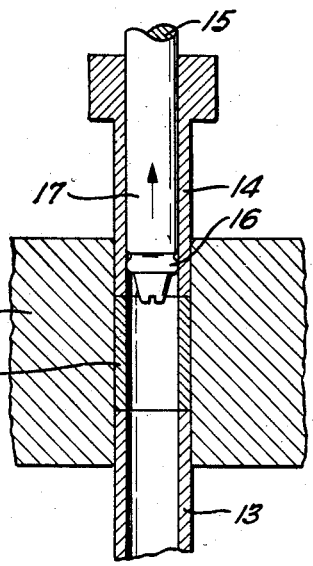
Fig. 5.　　Fig. 6.
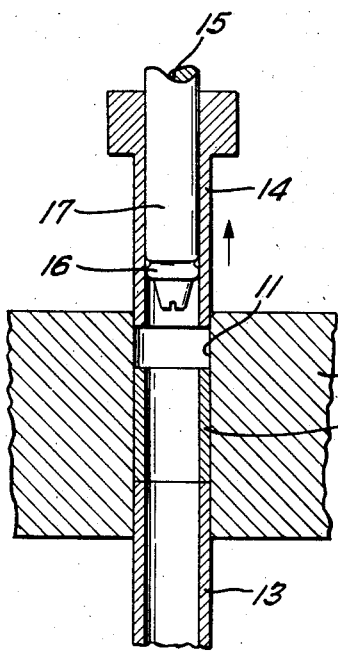
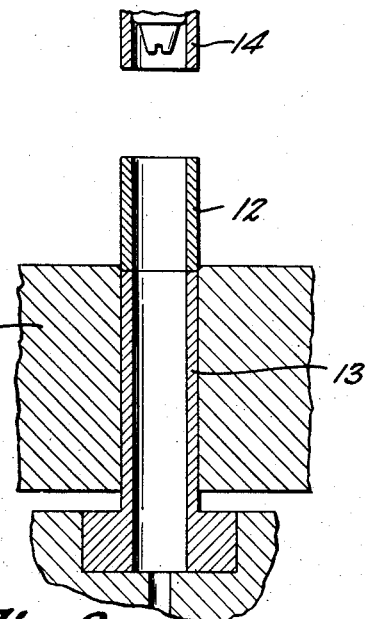
Fig. 7.　　Fig. 8.

Patented Aug. 1, 1939

2,168,301

UNITED STATES PATENT OFFICE 2,168,301

METHOD OF SIZING POROUS METAL BUSHINGS

John Conrad Lemming and James H. Davis, Dayton, Ohio, assignors to General Motors Corporation, Detroit, Mich., a corporation of Delaware Application June 18, 1937, Serial No. 148,899

5 Claims. (Cl. 29—149.5)

This invention relates to an improved method of sizing sintered porous metal bushings.

An object of this invention is to provide sized porous bronze or other porous metal bushings having a high degree of outer surface porosity with the open pores leading to the outer surface thereof.

Sintered porous metal bushings have heretofore been supported in place in die-cast structures wherein the die-cast metal was cast directly around and bonded to the porous metal bushing by the casting operation. This has been particularly true in washing machine structures where the wringer roll bearings and the center post bearings are sintered porous metal bushings supported in place by die-cast metal cast directly therearound. However frequent failures have occurred in such bearings, and it has been found that such failures are due to electrolytic corrosion between the porous bronze bushing and the die-cast metal when in contact with soap water or other liquid which can function as an electrolyte. When such electrolytic corrosion occurs between the porous bushing and the die-cast support therefor, the products of this corrosion form and are trapped between the bushing and the die-cast metal and as such products of corrosion increase in volume an enormous radially inward pressure is exerted upon the porous bushing. This radial pressure finally results in distorting the porous bushing wall radially inward upon the shaft and thereby causing failure of the bearing.

Now this invention attacks and solves this problem by providing a sized porous metal bushing having such a high degree of porosity on its outer surface that the die-cast metal will uniformly penetrate into the pores of the bushing when cast therearound and thereby effectively seal the joint between the cast metal and the porous bushing against the penetration of soap water or other liquid into this joint. Various unsuccessful attempts have been made heretofore to stop this electrolytic corrosion when using porous metal bushings sized by ordinary sizing methods. So far as known, all prior sizing methods for porous metal bushings burnish the outside surface of the bushing by the sizing die and so materially close off the surface pores so that the die-cast metal cannot penetrate sufficiently into the porous metal to effectively seal the joint.

Further objects and advantages of the present invention will be apparent from the following description, reference being had to the accompanying drawings wherein a preferred embodiment of the present invention is clearly shown.

The drawings illustrate the sizing method of this invention.

Fig. 5 shows the parts at the end of the down stroke of the inner punch.

Fig. 6 shows the withdrawal of the inner punch from the bushing while held clamped between the two tubular punches.

Fig. 7 shows the subsequent withdrawal of the upper tubular punch.

Fig. 8 shows the sized bushing ejected by the lower tubular punch.

Similar reference characters refer to similar parts throughout the several views.

Figure 1:
Fig. 1 shows the unsized bushing loosely entering the sizing bore and being carried down by gravity by the lower punch.
Figure 1:
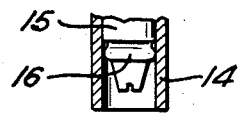
Figure 1:
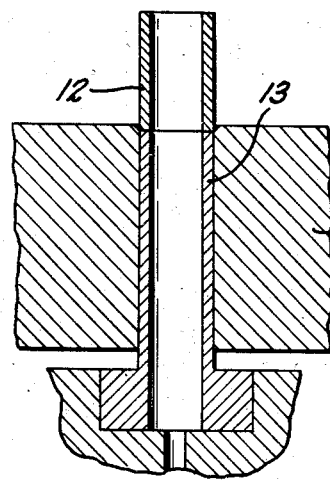
Figure 2:
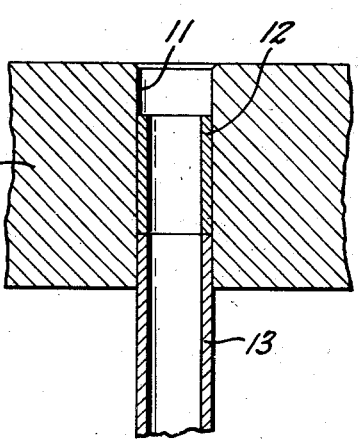
Fig. 2 shows the unsized bushing at its lowest position.

10 designates the stationary sizing die having the cylindrical sizing bore 11 therein. This bore 11 is slightly larger in diameter than the unsized sintered porous metal bushing 12 and hence this bushing 12 will readily drop into bore 11 by gravity when placed in the position shown in Fig. 1. The important result of the loose fit of bushing 12 in its sizing bore 11 is the elimination of any pressure rubbing or burnishing action on the outer surface of the bushing. Fig. 2 shows bushing 12 resting by gravity upon the upper end of the lower tubular punch 13 after said punch 13 has receded to its lowest position.

Figure 3:
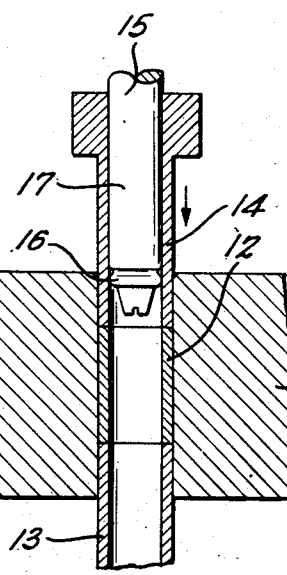
Fig. 3 shows the upper tubular punch compressing and sizing the bushing as to length.

The upper tubular punch 14 next descends and compresses bushing 12 endwise and thereby sizes it to proper length, as shown in Fig. 3.

Figure 4:
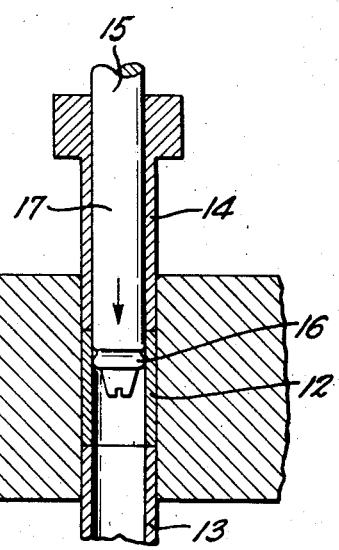
Fig. 4 shows the inner punch descending and expanding the bushing radially outward.

Then while bushing 12 is held clamped between the two tubular punches 13 and 14, the expanding central punch 15 descends and radially expands bushing 12 outwardly into pressure contact with the die bore 11 (see Figs. 4 and 5). This punch 15 has a rounded expanding land or button 16 at its entering end which has such a diameter as to progressively distort and force the porous metal wall of bushing 12 outward into contact with the bore 11. This expanding land 16 is immediately followed by the slightly larger straight portion 17 of punch 15. This straight portion 17 passes entirely thru bushing 12 and in so doing highly compresses the porous bushing wall radially against the bore 11 and thereby sets the bushing in its expanded shape. The bushing is thus sized on its inner diameter according to the diameter of the straight portion 17 of punch 15. Also since this straight portion 17 is guided and held accurately centered by the two tubular punches 13 and 14 which in turn are held centered by the bore 11, it will be seen that accurate concentricity of the inner and outer diameters of bushing 12 is obtained in the finally sized bushing.

From the positions shown in Fig. 5, the punch 15 is first raised to clear bushing 12 (see Fig. 6) and thereafter both punch 15 and the upper tubular punch 14 are raised out of the way to permit the upward ejection of the bushing 12 from the bore 11 (see Figs. 7 and 8). Bushing 12 is then pushed out of bore 11 by raising the lower tubular punch 13. This ejection of bushing 12 is quite easy and will not give such a pressure rubbing or burnishing action upon the outside of bushing 12 as to close the surface pores therein, because after the sizing portion 17 of punch 15 has been withdrawn from bushing 12 the previous high pressure between the outside of bushing 12 and the die bore 11 is relieved due to a tendency of the expanded bushing 12 to uniformly slightly contract after the expanding punch has been withdrawn. The diameters of the various punches and bore 11 are so chosen that the final ejected bushing has the desired inside and outside diameters. In other words if the above-mentioned slight contraction of bushing 12 is sufficiently large to be of any moment or need correction for accuracy, such correction can be readily made by allowing for such contraction when choosing the diameters of the punches and of bore 11. The degree of contraction with any given size of bushing can be readily determined by trial and corrected accordingly if so desired.

Thus it will be clear that by the method of this invention porous metal bushings may be sized by compressing the porous walls thereof without at the same time materially closing the pores on the outer surface of the bushing. This invention applies to any porous metal bushings but particularly to porous bronze bushings made by sintering suitable metal powders together as, for instance, described in Patent No. 1,556,658, October 13, 1925 to H. M. Williams.

While the embodiment of the present invention as herein disclosed, constitutes a preferred form, it is to be understood that other forms might be adopted, all coming within the scope of the claims which follow.

What is claimed is as follows:

1. The method of making a sized sintered porous metal bushing having substantially unclosed pores leading to its outer surface, comprising: making a sintered porous metal bushing having a slightly smaller outer diameter than the final bushing, loosely inserting the unsized bushing in a sizing die having a bore of substantially the desired outer diameter of the bushing, then passing an expanding punch endwise thru the bushing bore while maintaining the bushing stationary relative to the die and thereby progressively expanding the bushing from end to end thereof radially outward into pressure contact with the outer die bore, for slightly expanding the bushing radially outwardly and sizing the outer surface thereof without closing the pores leading to the outer surface by a burnishing action and then removing the bushing from the die.

2. The method of sizing a sintered porous metal bushing to a predetermined inside and outside diameter, comprising: loosely inserting the unsized bushing in the bore of a sizing die, then passing a sizing tool endwise thru the bushing bore while maintaining the bushing stationary relative to the die and thereby progressively expanding the bushing directly radially outward into pressure contact with the outer die bore, for sizing the outer surface of said bushing without closing the pores at said outer surface by a burnishing action and then removing the bushing from the die.

3. The method of sizing a sintered porous metal bushing to a predetermined inside and outside diameter, comprising: loosely inserting the unsized bushing in the bore of a sizing die, then passing an expanding punch endwise thru the bushing bore while maintaining the bushing stationary relative to the die and thereby progressively expanding the bushing from end to end thereof radially outward into pressure contact with the outer die bore, the expanding punch being followed by a sizing punch of slightly larger diameter than the expanding punch, for sizing the porous bushing without materially closing the pores at its outer surface and then removing the bushing from the die.

4. The method of sizing a continuous cylindrical sintered porous metal bushing to a predetermined outside diameter comprising, inserting an undersized porous metal bushing into a sizing die having a bore substantially equal to the desired outer diameter of the bushing in its final form, expanding the bushing radially outwardly while maintaining the bushing stationary relative to the die, for sizing the outer diameter of the bushing to substantially the diameter of the sizing die without closing the pores at the outer surface of the porous metal bushing and then removing the bushing from the die.

5. A method of sizing a continuous cylindrical sintered porous metal bushing to a predetermined length and outside diameter comprising, inserting a bushing of greater length than desired but slightly undersized in diameter into a sizing die having a bore substantially equal to the desired outer diameter of the bushing in its final form, compressing a bushing longitudinally to the desired length, expanding the bushing radially outwardly, while maintaining the bushing stationary relative to the die, by means of an expanding punch passed therethrough, for sizing the outer diameter of the bushing to substantially the diameter of the sizing die without any burnishing action on the outer surface of the bushing and then removing the bushing from the die.

JOHN CONRAD LEMMING.
JAMES H. DAVIS.